(12) United States Patent
Hansen

(10) Patent No.: US 6,630,223 B2
(45) Date of Patent: Oct. 7, 2003

(54) SPIRALLY WOUND SHAPED YARNS FOR PAPER MACHINE CLOTHING AND INDUSTRIAL BELTS

(75) Inventor: Robert A. Hansen, Stuttgart-Birkach (DE)

(73) Assignee: Albany International Corp., Albany, NY (US)

( * ) Notice: Subject to any disclaimer, the term of this patent is extended or adjusted under 35 U.S.C. 154(b) by 147 days.

(21) Appl. No.: 09/770,891

(22) Filed: Jan. 26, 2001

(65) Prior Publication Data
US 2002/0102894 A1 Aug. 1, 2002

(51) Int. Cl.[7] .................................................. D02G 3/22
(52) U.S. Cl. ..................... 428/131; 428/58; 428/163; 428/223; 428/397; 442/337; 442/338; 162/358.2; 162/900
(58) Field of Search .................. 442/337, 338; 162/358.2, 900; 428/58, 163, 223, 397, 131

(56) References Cited

U.S. PATENT DOCUMENTS

| | | |
|---|---|---|
| 2,943,379 A | 7/1960 | Foltz, Jr. |
| 3,097,413 A | 7/1963 | Draper, Jr. |
| 4,495,680 A | 1/1985 | Beck |
| 4,537,658 A | 8/1985 | Albert |
| 4,594,756 A | 6/1986 | Beck |
| 4,781,967 A | 11/1988 | Legge et al. |
| 4,842,905 A | 6/1989 | Stech |
| 6,124,015 A * | 9/2000 | Baker et al. ................ 428/100 |

FOREIGN PATENT DOCUMENTS

| | | |
|---|---|---|
| DE | 12 45 908 B | 8/1967 |
| EP | 0 464 258 A | 1/1992 |
| EP | 0 538 211 A | 4/1993 |
| EP | 0 541 498 A | 5/1993 |
| EP | 0 665 329 A | 8/1995 |
| EP | 0 802 280 A | 10/1997 |
| EP | 0 947 627 A1 | 10/1999 |
| EP | 1 063 349 A | 12/2000 |
| GB | 1187256 | 4/1970 |
| WO | WO 9858120 A | 12/1998 |

* cited by examiner

Primary Examiner—Elizabeth M. Cole
(74) Attorney, Agent, or Firm—Frommer Lawrence & Haug LLP; Ronald R. Santucci

(57) ABSTRACT

A fabric for the forming, press and dryer sections of a paper machine, for use as a reinforcing base for a polymeric-resin-coated paper-processing belt or as a corrugator belt, or in other industrial settings where a material is being dewatered, is formed from a monofilament yarn, which is spirally wound in the form of a closed helix, adjacent turns thereof being abutted against and joined securely to one another. The monofilament yarn has a first side and a second side which are oppositely and correspondingly shaped, so that, when spirally wound in a plurality of turns, the first side fits closely into or against the second side of an adjacent and abutting turn, and adjacent spiral turns are secured to one another at the abutting first and second sides to form the fabric.

6 Claims, 7 Drawing Sheets

SPIRALLY WOUND SHAPED YARNS FOR PAPER MACHINE CLOTHING AND INDUSTRIAL BELTS

BACKGROUND OF THE INVENTION

1. Field of the Invention

The present invention relates to the papermaking arts. More specifically, the present invention relates to papermaker's fabrics, namely the forming, press and dryer fabrics, also known as paper machine clothing, on which paper is manufactured on a paper machine. In addition, the present invention may be applied in other industrial settings where industrial belts are used to dewater a material.

2. Description of the Prior Art

During the papermaking process, a cellulosic fibrous web is formed by depositing a fibrous slurry, that is, an aqueous dispersion of cellulose fibers, on a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulose fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speed. That is to say, the fibrous slurry is continuously deposited onto the forming fabric in the forming section, while a newly manufactured paper sheet is continuously wound onto rolls after it exits from the dryer section.

It should also be appreciated that the vast majority of forming, press and dryer fabrics are, or at least include as a component, a woven fabric in the form of an endless loop having a specific length, measured longitudinally therearound, and a specific width, measured transversely thereacross. Because paper machine configurations vary widely, paper machine clothing manufacturers are required to produce forming, press and dryer fabrics to the dimensions required to fit particular positions in the forming, press and dryer sections of the paper machines of their customers. Needless to say, this requirement makes it difficult to streamline the manufacturing process, as each fabric must typically be made to order.

Moreover, because the surface of a woven fabric is necessarily uneven to some degree, as knuckles formed where yarns lying in one direction of the fabric wrap around those lying in another direction lie on the surface, it is difficult to produce a paper product entirely free of sheet marking.

The prior art includes several attempts to solve these problems. For example, U.S. Pat. No. 4,495,680 to Beck shows a method and apparatus for forming a base fabric composed solely of warp yarns to be used in making a papermaker's felt. Essentially, the warp yarns are helically wound about two parallel rolls. Subsequently, fibrous batting or other nonwoven material is applied and adhered to the helical array of warp yarns to provide a fillingless papermaker's felt, which is to say that it has no cross-direction yarns. By eliminating cross direction yarns, the drainage characteristics of the felt are said to be improved, and pressure points caused by yarn crossovers are said to be eliminated.

U.S. Pat. No. 4,537,658 to Albert shows a papermaker's fabric made from a plurality of elongated, linked, slotted elements. The elongated elements can be formed by extrusion or by lamination, and are linked one to the next either by an integral tongue or through the use of a pintle connecting means which extends from one elongated element to the adjacent element. The elongated elements extend in the cross-machine direction of the disclosed papermaker's fabrics, and have flat, parallel top and bottom surfaces.

U.S. Pat. No. 4,594,756 to Beck also shows a method and apparatus for forming a base fabric composed solely of warp yarns to be used in making a papermaker's felt. The method and apparatus shown are improved relative to those disclosed in U.S. Pat. No. 4,495,680, which was discussed above. As in the earlier patent, the endless base fabric, or substrate, produced is composed solely of machine-direction yarns and can subsequently be needled with fibrous batting to produce all or a part of a papermaker's felt or other fabric.

U.S. Pat. No. 4,842,905 to Stech shows a tessellated papermaker's fabric and elements for making the fabric. The elements are formed so as to have male or projection members which interlock with female or recess members. The papermaker's fabric comprises a plurality of the tessellated elements which have been interconnected to produce a tessellation of a desired length and width. The fabrics are said to be designed to produce desired air and moisture permeabilities and drainage characteristics while providing an increased control over the paper-carrying surface thereof.

The present invention provides an alternative solution to the problems addressed by these prior-art patents.

SUMMARY OF THE INVENTION

Accordingly, the present invention is a fabric for the forming, press and dryer sections of a paper machine. The fabric may also be used as a reinforcing base for a polymeric-resin-coated paper-processing belt, such as a sheet-transfer, long nip press (LNP) or calender belt, and as part of other industrial process belts, such as corrugator belts. Moreover, the fabric may be used in other industrial settings where industrial belts are used to dewater a material. For example, the present invention may be used as a pulp-forming or pulp-pressing fabric; as a fabric used to dewater recycled paper during the deinking process, such as a dewatering fabric or belt on a double-nip-thickener (DNT) deinking machine; or as a sludge dewatering belt. The fabric is in the form of an endless loop, and has an inner surface and an outer surface.

The fabric comprises a monofilament yarn of non-circular cross section, which monofilament yarn has a length, an upper surface and a lower surface. Preferably, the upper and lower surfaces are flat and parallel to one another. Alternatively, the upper and lower surfaces may be convexly or concavely rounded in their widthwise directions. The monofilament yarn also has a first side and a second side, which are oppositely and correspondingly shaped.

The monofilament yarn is spirally wound in a plurality of turns wherein the first side of the monofilament yarn fits against the second side of an adjacent abutting spiral turn thereof. Adjacent spiral turns of the monofilament yarn are secured to one another at the abutting first and second sides to form the fabric by a variety of means.

The monofilament yarn may have cooperating first and second sides having any one of several different opposite and corresponding shapes. Specifically, the first side may have a cylindrically convex shape while the second side may have a cylindrically concave shape of the same radius of curvature, so that the first and second sides of adjacent turns of the monofilament can fit closely together when abutted against one another. Alternatively, the first and second sides may be planar, and slanted in parallel directions, so that the first and second sides of adjacent turns can fit closely together when abutted against one another.

The first and second sides of the monofilament yarn may alternatively form a tongue-in-groove joint, or may have snappingly engagable male and female mutually interlocking members, respectively. The first and second sides may also have portions of reduced thickness which overlap one another when the monofilament yarn is spirally wound to produce the fabric. Attachment of adjacent abutting turns of the monofilament yarn to one another may be made through the use of an adhesive, which may be a heat-activated, room-temperature-cured (RTC) or hot-melt adhesive, where the first and second sides are not provided with interlocking members.

The monofilament yarns may be provided with holes passing therethrough from their upper to their lower surfaces for the drainage of water from a cellulosic fibrous web being conveyed by the fabric. The monofilament yarns may also be hollow, providing them with resiliency as well as void volume for the temporary storage of water. Where this is the case, the monofilament yarn may have holes connecting the upper surface of the monofilament yarn to the void volume, and may also have holes connecting the lower surface of the monofilament yarn to the void volume. In any event, the holes may be produced by needling or by laser "punching", or may be formed during extrusion.

One or both of the upper and lower surfaces of the monofilament yarn may be provided with grooves for the temporary storage of water. The grooves may be provided during the extrusion of the monofilament yarns; that is, they may be provided by the die used to extrude the yarns. The grooves may also be provided through the use of a slitter knife or the like while the monofilament yarn is being spirally wound to form the fabric or at any time thereafter.

The fabric of the present invention may be included as part of a multi-layered laminated fabric comprising two or more layers produced from the monofilament yarn. Alternatively, the fabric may be laminated with a woven base fabric, or with unwoven systems of longitudinal and/or transverse yarns.

The fabric, when used as a press fabric in the press section of a paper machine, may also be provided with a staple fiber batt attached to either one or both of its inner and outer surfaces by needling or by an adhesive, which may be a heat-activated, room-temperature-cured (RTC) or hot-melt adhesive, or by needle punching. Layers of non-woven fibrous material, such as those manufactured by Sharnet, can be used in addition to, or as a substitute for, some portion or all of the staple fiber batt. These can include spun bonds, melt blowns and the like.

The present invention will now be described in more complete detail with frequent reference being made to the figures identified below.

DETAILED DESCRIPTION OF THE PREFERRED EMBODIMENTS

Figure 1:
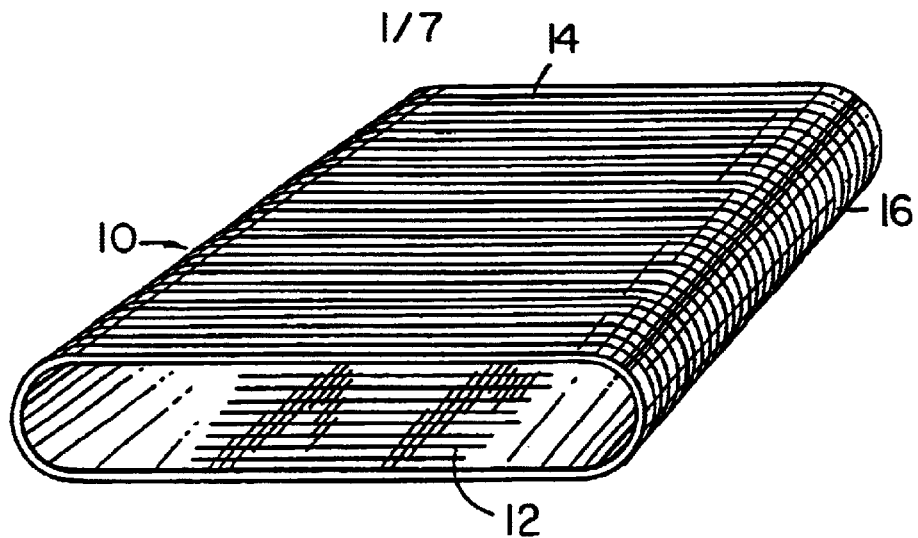
FIG. 1 is a perspective view of the fabric of the present invention.

Turning now specifically to these figures, FIG. 1 is a perspective view of the fabric 10 of the present invention. The fabric 10 has an inner surface 12 and an outer surface 14, and is fashioned by spirally winding a monofilament yarn 16 in a plurality of abutting and mutually adjoined turns. The monofilament yarn 16 spirals in a substantially longitudinal direction around the length of the fabric 10 by virtue of the helical fashion in which the fabric 10 is constructed.

Figure 2:
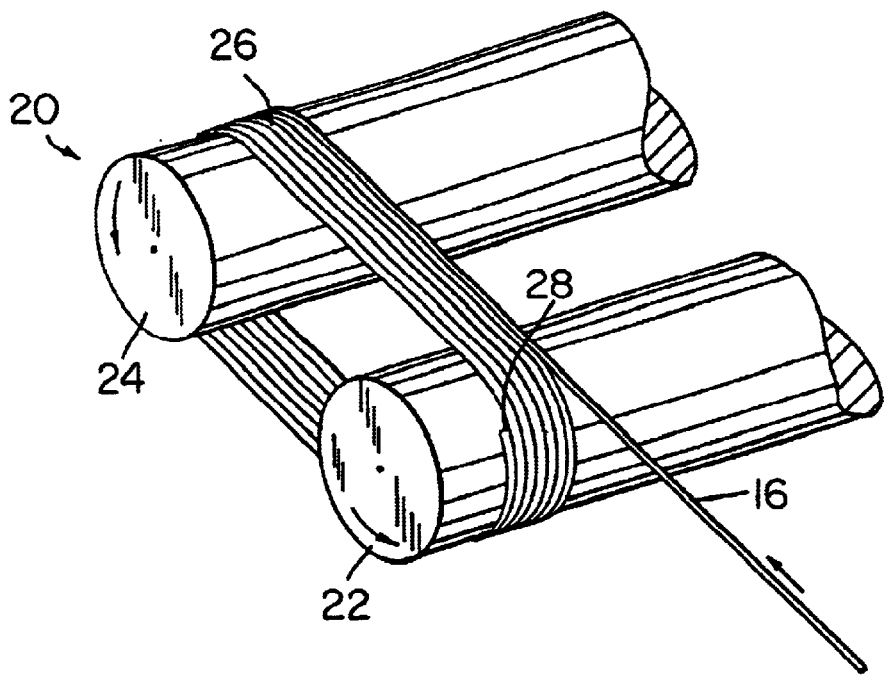
FIG. 2 illustrates a method by which the fabric of the present invention may be constructed.

A method by which the fabric 10 may be manufactured is illustrated in FIG. 2. Apparatus 20 includes a first process roll 22 and a second process roll 24, each of which is rotatable around its longitudinal axis. The first process roll 22 and the second process roll 24 are parallel to one another, and are separated by a distance which will determine the overall length of the fabric 10 to be manufactured thereon, as measured longitudinally therearound.

To begin the manufacture of the fabric 10, the beginning of monofilament yarn 16 is extended in taut condition from the first process roll 22 toward the second process roll 24, around the second process roll 24, and back to the first process roll 22 forming a first coil of a closed helix 26. To close the first coil of the closed helix 26, the beginning of the monofilament yarn 16 is joined to the end of the first coil thereof at point 28. As will be discussed below, adjacent turns of the spirally wound monofilament yarn 16 are joined to one another by mechanical or adhesive means.

Therefore, subsequent coils of closed helix 26 are produced by rotating first process roll 22 and second process roll 24 in a common direction as indicated by the arrows in FIG. 2, while feeding the monofilament yarn 16 onto the first process roll 22. At the same time, the monofilament yarn 16 being freshly wound onto the first process roll 22 is continuously joined to that already on the first process roll 22 and the second process roll 24 by mechanical or adhesive means to produce additional coils of closed helix 26.

This process continues until the closed helix 26 has a desired width, as measured axially along the first process roll 22 or the second process roll 24. At that point, the monofilament yarn 16 not yet wound onto the first process roll 22 and the second process roll 24 is cut, and the closed helix 26 produced therefrom is removed from the first process roll 22 and the second process roll 24 to provide the fabric 10 of the present invention.

The present method for producing fabric 10 is quite versatile and adaptable to the production of papermaker's fabrics 10 of a variety of longitudinal and transverse dimensions, since the same apparatus 20 and monofilament yarn 16 are always used. That is to say, the manufacturer, by practicing the present invention, need no longer produce an endless or on-machine-seamable woven fabric of appropriate length and width for a given paper machine. Rather, the manufacturer need only separate the first process roll 22 and the second process roll 24 by the appropriate distance, to determine the length of the fabric 10, and wind the monofilament yarn 16 onto the first process roll 22 and the second process roll 24 until the closed helix 26 has reached the desired width.

Further, because the fabric 10 is produced by spirally winding monofilament yarn 16, and is not a woven fabric, the outer surface 12 of the fabric 10 is smooth and continuous, and lacks the knuckles which prevent the surfaces of a woven fabric from being perfectly smooth.

FIGS. 3A through 3H are cross-sectional views, taken in a widthwise direction, of several embodiments of the monofilament yarn used to produce the present fabric. Each embodiment includes upper and lower surfaces which may be flat (planar) and parallel to one another.

Figure 3A:
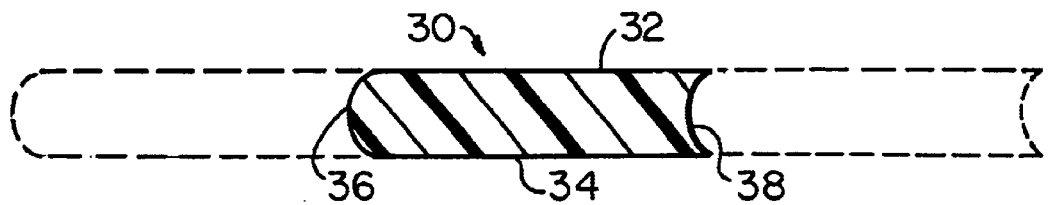
FIGS. 3A through 3H are cross-sectional views taken in a widthwise direction of several embodiments of the monofilament yarns used to manufacture the fabric.

Turning to FIG. 3A, monofilament yarn 30 has an upper surface 32, a lower surface 34, a cylindrically convex side 36 and a cylindrically concave side 38. The upper surface 32 and the lower surface 34 are flat (planar) and parallel to one another. The cylindrically convex side 36 and cylindrically concave side 38 have the same radius of curvature, so that the convex side 36 of each spirally wound turn of monofilament yarn 30 fits into the concave side 38 of the immediately preceding turn thereof. Each turn of the monofilament yarn 30 is joined to its adjacent turns by joining their respective convex and concave sides 36, 38 to one another by an adhesive, which may be a heat-activated, room-temperature-cured (RTC) or hot-melt adhesive.

Figure 3B:
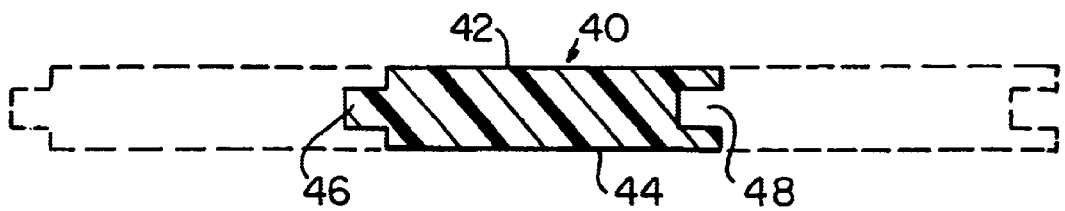

In FIG. 3B, monofilament yarn 40 has an upper surface 42, a lower surface 44, a tongue 46 on one side and a corresponding groove 48 on the other side. The upper surface 42 and the lower surface 44 are flat (planar) and parallel to one another. The tongue 46 has dimensions corresponding to those of the groove 48, so that the tongue 46 on each spirally wound turn of monofilament yarn 40 fits into the groove 48 of the immediately preceding turn thereof. Each turn of the monofilament yarn 40 is joined to its adjacent turns by securing tongues 46 in the grooves 48 with an adhesive, which may be a heat-activated, room-temperature-cured (RTC) or hot-melt adhesive.

Figure 3C:
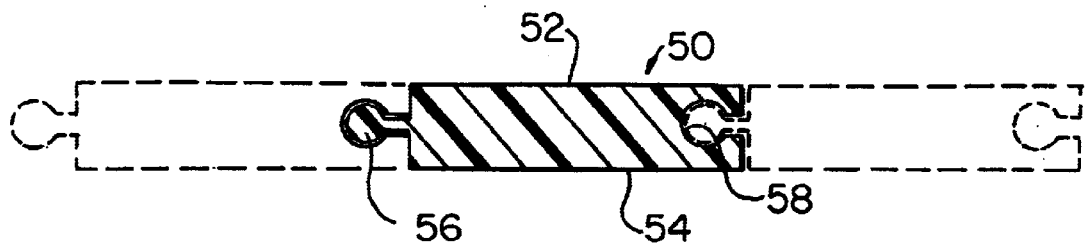

In FIG. 3C, monofilament yarn 50 has an upper surface 52, a lower surface 54, a male interlocking member 56 on one side and a corresponding female interlocking member 58 on the other side. The upper surface 52 and the lower surface 54 are flat (planar) and parallel to one another. The male interlocking member 56 has rounded dimensions corresponding to those of the female interlocking member 58, so that the male interlocking member 56 on each spirally wound turn of monofilament yarn 50 snappingly fits into the female interlocking member 58 of the immediately preceding turn thereof. Each turn of the monofilament yarn 50 may be additionally secured to its adjacent turns by joining the male interlocking member 56 to the female interlocking member 58 with an adhesive, which may be a heat-activated, room-temperature-cured (RTC) or hot-melt adhesive.

Figure 3D:
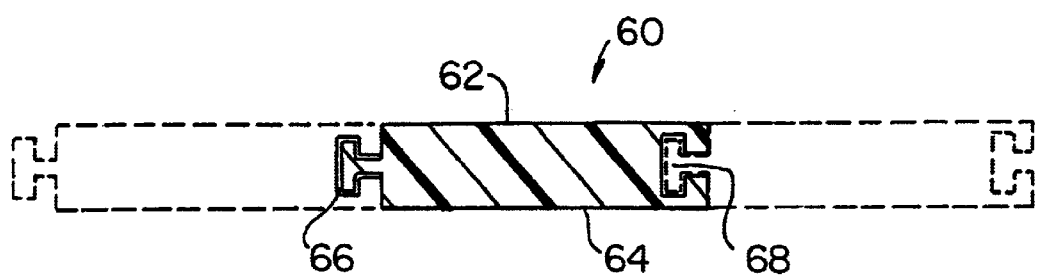

In FIG. 3D, monofilament yarn 60 has an upper surface 62, a lower surface 64, a male interlocking member 66 on one side and a corresponding female interlocking member 68 on the other side. The upper surface 62 and the lower surface 64 are flat (planar) and parallel to one another. The male interlocking member 66 has T-shaped dimensions corresponding to those of the female interlocking member 68, so that the male interlocking member 66 on each spirally wound turn of monofilament yarn 60 snappingly fits into the female interlocking member 68 of the immediately preceding turn thereof. Each turn of the monofilament yarn 60 may be additionally secured to its adjacent turns by joining the male interlocking member 66 to the female interlocking member 68 with an adhesive, which may be a heat-activated, room-temperature-cured (RTC) or hot-melt adhesive.

Figure 3E:
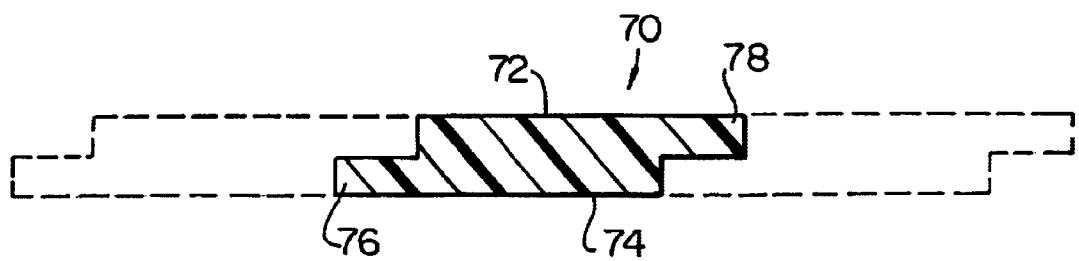

In FIG. 3E, monofilament yarn 70 has an upper surface 72, a lower surface 74, a first portion 76 of reduced thickness lying below the upper surface 72 on one side, and a corresponding second portion 78 of reduced thickness lying above the lower surface 74 on the other side. The upper surface 72 and the lower surface 74 are flat (planar) and parallel to one another. The first portion 76 has dimensions corresponding to those of the second portion 78, so that the first portion 76 on each spirally wound turn of monofilament yarn 70 fits under the second portion 78 of the immediately preceding turn thereof. The first and second portions 76, 78 have a combined thickness equal to that of the monofilament yarn 70 as a whole, so that the fabric manufactured therefrom will have a uniform thickness. Each turn of the monofilament yarn 70 is joined to its adjacent turns by securing first portions 76 to second portions 78 with an adhesive, which may be a heat-activated, room-temperature-cured (RTC) or hot-melt adhesive.

Figure 3F:
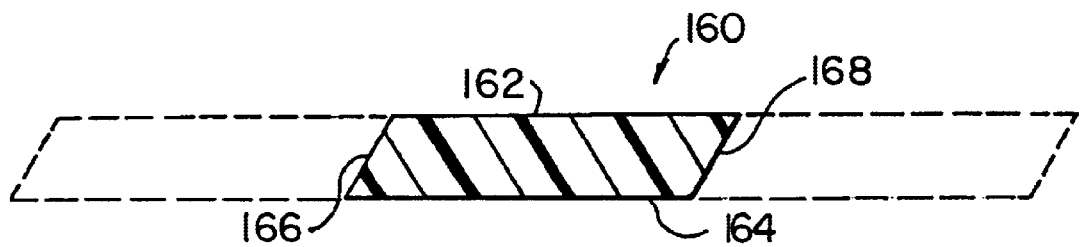

In FIG. 3F, monofilament yarn 160 has an upper surface 162, a lower surface 164, a first planar side 166 and a second planar side 168. The upper surface 162 and the lower surface 164 are flat (planar) and parallel to one another, and the first planar side 166 and the second planar side 168 are slanted in parallel directions, so that the first planar side 166 of each spirally wound turn of monofilament yarn 160 abuts closely against the second planar side 168 of the immediately preceding turn thereof. Each turn of the monofilament yarn 160 is joined to its adjacent turns by joining their respective first and second planar sides 166, 168 to one another by an adhesive, which may be a heat-activated, room-temperature-cured (RTC) or hot-melt adhesive.

Figure 3G:
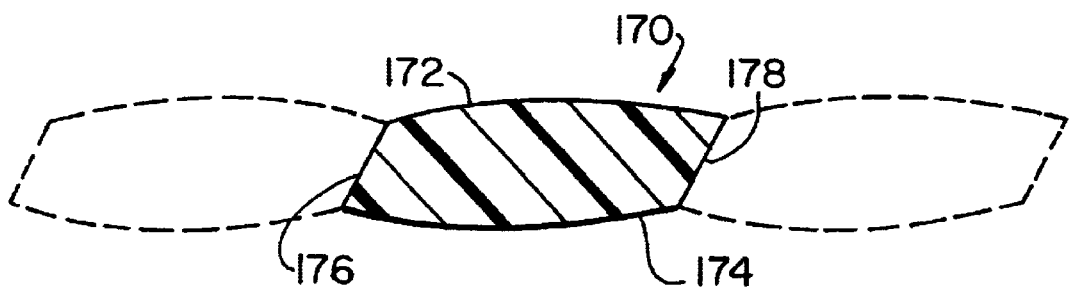

In FIG. 3G, monofilament yarn 170 has an upper surface 172, a lower surface 174, a first planar side 176 and a second planar side 178. The upper surface 172 and the lower surface 174 are convexly rounded in the widthwise direction thereof. The first planar side 176 and the second planar side 178 are slanted in parallel directions, so that the first planar side 176 of each spirally wound turn of monofilament yarn 170 abuts closely against the second planar side 178 of the immediately preceding turn thereof. Each turn of the monofilament yarn 170 is joined to its adjacent turns by joining their respective first and second planar sides 176, 178 to one another by an adhesive, which may be a heat-activated, room-temperature-cured (RTC) or hot-melt adhesive.

Figure 3H:
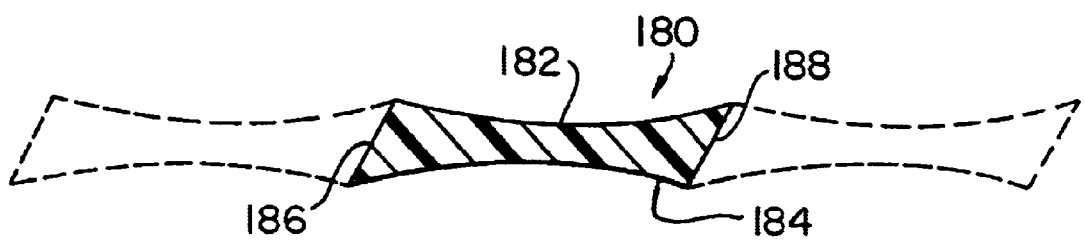

In FIG. 3H, monofilament yarn 180 has an upper surface 182, a lower surface 184, a first planar side 186 and a second planar side 188. The upper surface 182 and the lower surface 184 are concavely rounded in the widthwise direction thereof. The first planar side 186 and the second planar side 188 are slanted in parallel directions, so that the first planar side 186 of each spirally wound turn of monofilament yarn 180 abuts closely against the second planar side 188 of the immediately preceding turn thereof. Each turn of the monofilament yarn 180 is joined to its adjacent turns by joining their respective first and second planar side 186, 188 to one another by an adhesive, which may be a heat-activated, room-temperature-cured (RTC) or hot-melt adhesive.

Referring to the embodiments shown in FIGS. 3G and 3H, it should be appreciated that only one of the upper surfaces 172, 182 or lower surfaces 174, 184 may be convexly or concavely rounded in the widthwise direction, while the other surface may be flat (planar). Moreover, the upper surface may be convexly curved, while the lower surface may be concavely curved, or vice versa. Such modifications should be understood to fall within the scope of the present invention.

The monofilament yarns described above may be extruded from any of the polymeric resin materials used by those of ordinary skill in the art to manufacture yarns for paper machine clothing, such as polyamide, polyester, polyurethane and polyketone resins.

Figure 4:
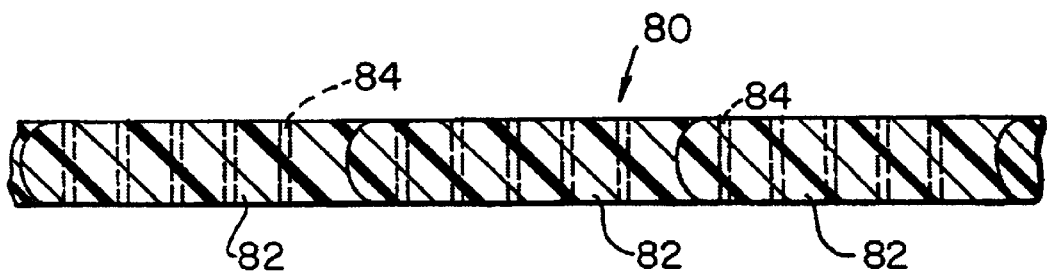
FIG. 4 is a cross section, taken in a transverse, or cross-machine, direction, of a fabric of the present invention.

It will be apparent to those of ordinary skill in the art that the monofilament yarns used to manufacture the fabrics of the present invention will ordinarily have to be provided with passages for conveying water away from a cellulosic fibrous web or other material being conveyed thereon. Referring to FIG. 4, which is a cross section, taken in a transverse, or cross-machine, direction, of a fabric 80 of the present invention, monofilament yarns 82 are provided along their entire lengths with a plurality of holes 84 for the passage of water from a cellulosic fibrous web.

Figure 5:
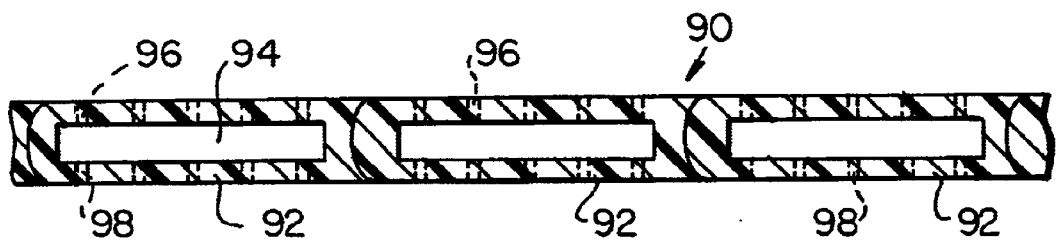
FIG. 5 is a cross section, taken in a transverse direction, of an alternate embodiment of the fabric.

FIG. 5 is a cross-sectional view, taken in a transverse direction, of an alternate embodiment of the fabric 90 of the present invention. Monofilament yarns 92 are hollow, and include void volume 94 for the storage of water from a cellulosic fibrous web. A plurality of holes 96, provided along the entire lengths of the monofilament yarns 92, pass through the monofilament yarn 92 from one of its two surfaces to the void volume. Optionally, a plurality of holes 98, also provided along the entire lengths of the monofilament yarns 92, may pass through the monofilament yarn 92 from the other of its two surfaces to the void volume.

Figure 6:
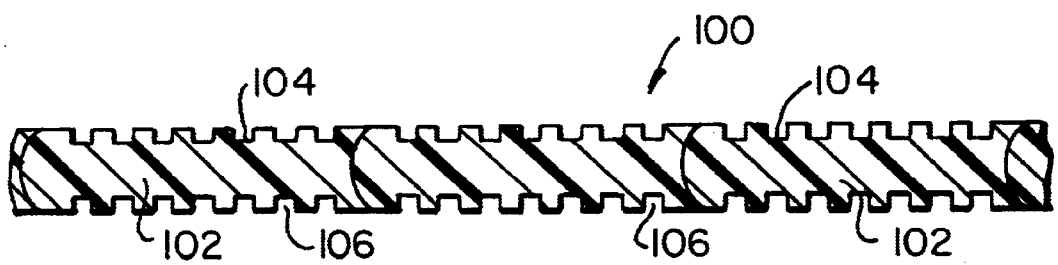
FIG. 6 is a similar view of another embodiment of the fabric.

FIG. 6 is a cross-sectional view, also taken in the transverse direction, of another embodiment of the fabric 100 of the present invention. Monofilament yarns 102 have a plurality of grooves 104 on one side thereof for the storage of water from a cellulosic fibrous web. The grooves 104 run lengthwise along the monofilament yarn 102. Optionally, a plurality of grooves 106, also running lengthwise along the monofilament yarn 102 may also be provided on the other of the two sides thereof.

Figure 7:
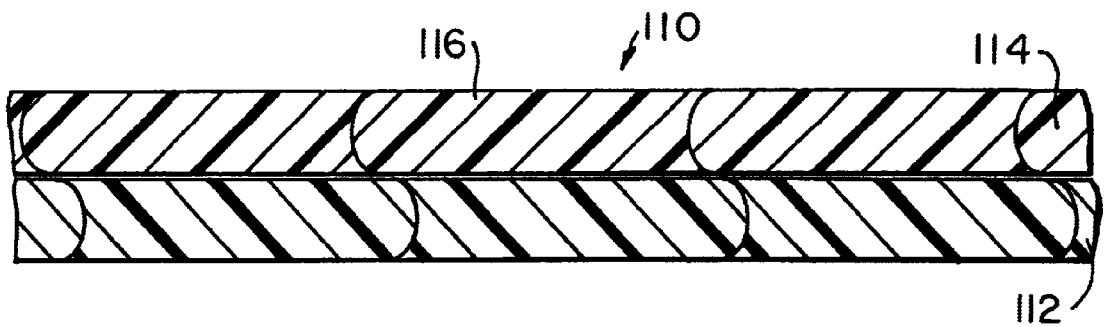
FIG. 7 is a cross section, taken in a transverse direction, of a laminated embodiment of the fabric of the present invention.

The fabrics of the present invention may also be laminated structures having a plurality of layers. For example, FIG. 7 is a cross-sectional view, taken in the transverse direction, of a fabric 110 having two layers 112, 114 of spirally wound monofilament yarns 116. One layer 112 may be assembled in the manner described above, and then the second layer 114 may be assembled by spirally winding monofilament yarns 116 onto layer 112. The two layers 112, 114 may be laminated together with an adhesive, which may be a heat-activated, room-temperature-cured (RTC) or hot-melt adhesive, or with a sheath of low-melt material of the variety manufactured by Sharnet. Monofilament yarns 116 may have holes, void volume or grooves as described above.

Figure 8:
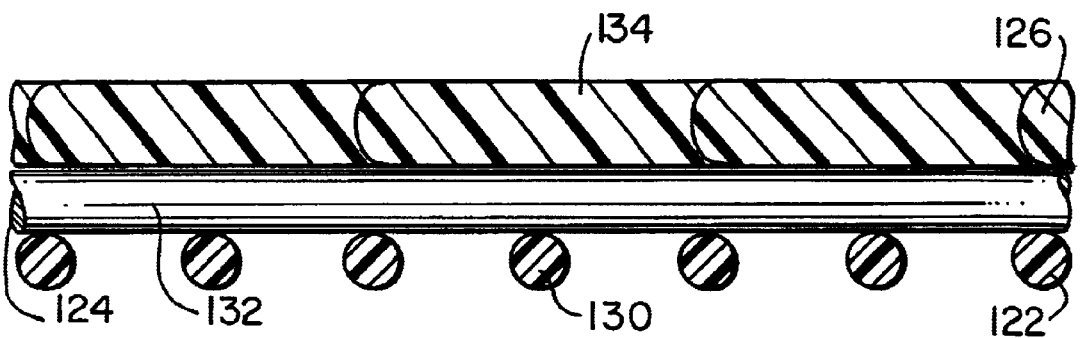
FIG. 8 is a similar view of another laminated embodiment of the fabric.

FIG. 8 is a cross-sectional view, taken in the transverse direction, of another laminated fabric 120. Fabric 120 has a first layer 122 of longitudinal yarns 130, a second layer 124 of transverse yarns 132, and a third layer 126 of monofilament yarns 134. Longitudinal yarns 130 and transverse yarns 132 are shown to be of circular cross section, but may alternatively have any other cross-sectional shape. Fabric 120 may be manufactured by spirally winding longitudinal yarns 130 around first and second process rolls 22, 24 in the same way as described above for monofilament yarns 16, but leaving space between each spiral turn of longitudinal yarn 130. Next, transverse yarns 132 are placed at intervals across the longitudinal yarns 130 and secured thereto by an adhesive, which may be a heat-activated, room-temperature-cured (RTC) or hot-melt adhesive. Finally, monofilament yarns 134 are spirally wound onto transverse yarns 132, and joined thereto by an adhesive, which may be a heat-activated, room-temperature-cured (RTC) or hot-melt adhesive, or with a sheath of low-melt material of the variety manufactured by Sharnet. Monofilament yarns 134 may have holes, void volume or grooves as described above. Alternatively, the order of these manufacturing steps may be reversed by first spirally winding monofilament yarns 134 around first and second process rolls 22, 24, by then placing transverse yarns 132 at intervals across the spirally wound monofilament yarns 134, and by finally spirally winding monofilament yarns 130 onto transverse yarns 132.

Figure 9:
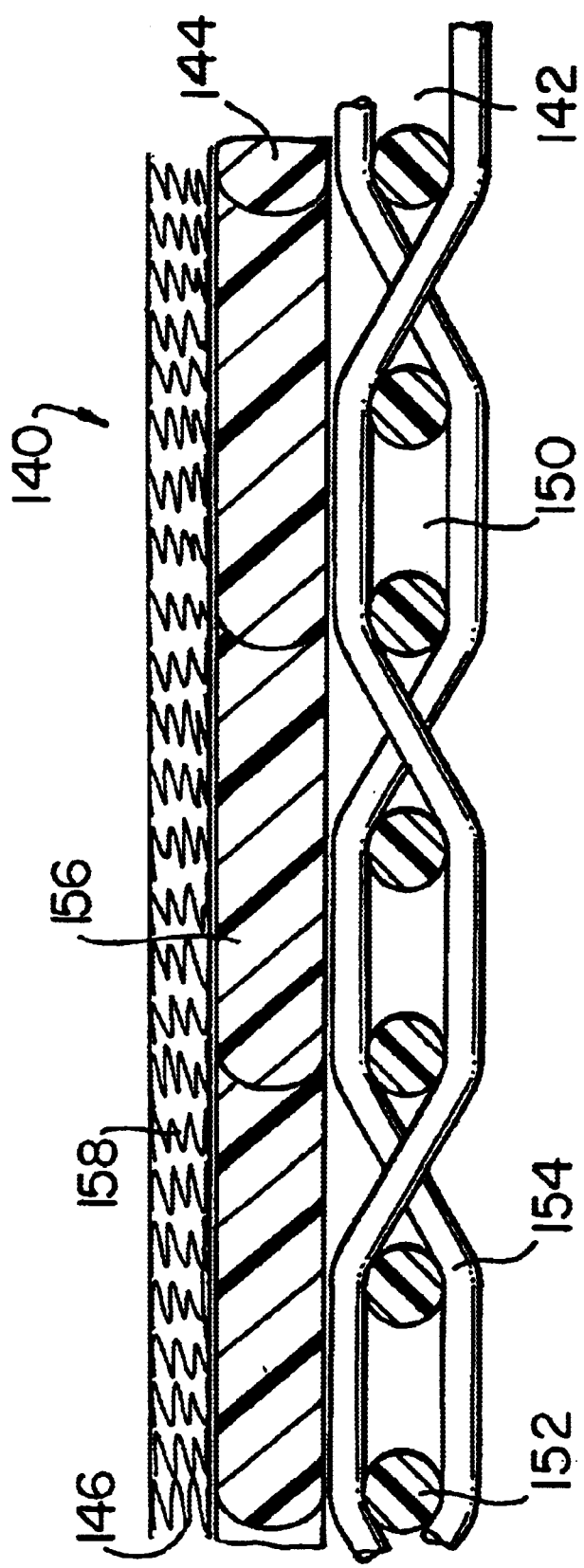
FIG. 9 is a similar view of still another laminated embodiment of the fabric.

FIG. 9 is a cross-sectional view, taken in the transverse direction, of yet another laminated fabric 140. Fabric 140 comprises a first layer 142, which is a base fabric 150 woven from a system of longitudinal yarns 152 and a system of transverse yarns 154. Base fabric 150 is in the form of an endless loop, which is placed in a taut condition about first and second process rolls 22, 24. Then, a second layer 144 of monofilament yarns 156 is formed by spirally winding monofilament yarns 156 onto base fabric 150 in the manner described above in the discussion of FIG. 2, and by joining monofilament yarns 156 to base fabric 150 with an adhesive, which may be a heat-activated, room-temperature-cured (RTC) or hot-melt adhesive, or by needling. It should be understood that the order of these manufacturing steps may be reversed by first spirally winding monofilament yarns 156 around first and second process rolls 22, 24, and by then placing base fabric 150 in the form of an endless loop of appropriate length about the first and second process rolls 22, 24 over layer 144. Monofilament yarns 156 may have holes, void volume or grooves as described above. Finally, a third layer 146 of staple fiber batt 158 may be attached to the second layer 144 of monofilament yarns 156 by needling or other means, such as an adhesive, which may be a heat-activated, room-temperature-cured (RTC) or hot-melt adhesive. When needled, staple fiber batt 158 may be used to attach the second layer 144 of monofilament yarns 156 to base fabric 150. Additional staple fiber batt can be added to the opposite side of base fabric 150. Further, it should also be understood that a layer of staple fiber batt may also be provided between first layer 142 and second layer 144.

These layers may include non-woven fibrous material, such as those manufactured by Sharnet, or may be entirely composed of such material. These can include spun bonds, melt blowns and the like.

Modifications to the above would be obvious to those of ordinary skill in the art, but would not bring the invention so modified beyond the scope of the appended claims.

What is claimed is:

1. A fabric for the forming, press and dryer sections of a paper machine, for use as a reinforcing base for a polymeric-resin-coated paper-processing belt or as a corrugator belt, or in other industrial settings where a material is being dewatered, said fabric being in the form of an endless loop and having an inner surface and an outer surface, said fabric comprising:

a monofilament yarn, said monofilament yarn having a length, an upper surface and a lower surface, and a first side and a second side, said first side and said second side being oppositely and correspondingly shaped, said monofilament yarn being spirally wound in a plurality of turns wherein said first side of said monofilament yarn fits into said second side of an adjacent abutting spiral turn of said monofilament yarn, adjacent spiral turns of said monofilament yarn being secured to one another at abutting first and second sides to form said papermaker's fabric, said monofilament yarn having a plurality of holes along said length thereof, said holes passing through said monofilament yarn from said upper surface to said lower surface, such that at least a portion of the upper surface of said fabric is formed by the abutting upper surfaces of abutting spiral turns of said monofilament yarn.

2. A fabric as claimed in claim 1 wherein said monofilament yarn is a hollow monofilament yarn, said monofilament yarn thereby having void volume for the temporary storage of water, and wherein said monofilament yarn has a first plurality of holes along said length thereof, said holes passing through said monofilament yarn from said upper surface to said void volume.

3. A monofilament yarn as claimed in claim 2 wherein said monofilament yarn further has a second plurality of holes along said length thereof, said holes passing through said monofilament yarn from said lower surface to said void volume.

4. A monofilament yarn for use in constructing papermaker's fabrics and other industrial belts, said monofilament yarn having a non-circular cross section, a length, an upper surface and a lower surface, and a first side and a second side, said first side and said second side being oppositely and correspondingly shaped, so that, when said monofilament yarn is spirally wound in a closed helix having a plurality of turns, said first side fits closely against said second side of an abutting turn of said closed helix, said monofilament yarn having a plurality of holes along said length thereof, said holes passing therethrough from said upper surface to said lower surface, such that when said yarn is used to form a fabric at least a portion of the upper surface of said fabric is formed by the abutting upper surfaces of abutting spiral turns of said monofilament yarn.

5. A monofilament yarn as claimed in claim 4, said monofilament yarn further being a hollow monofilament yarn having void volume therein for the temporary storage of water and further comprising a first plurality of holes along said length thereof, said holes passing from said upper surface to said void volume.

6. A monofilment yarn as claimed is claim 5 further comprising a second plurality of holes along said length therof, said holes passing from said lower surface to said void volume.

* * * * *